J. Barns,
Cotton Press.
No. 166. Patented Apr. 17, 1837.
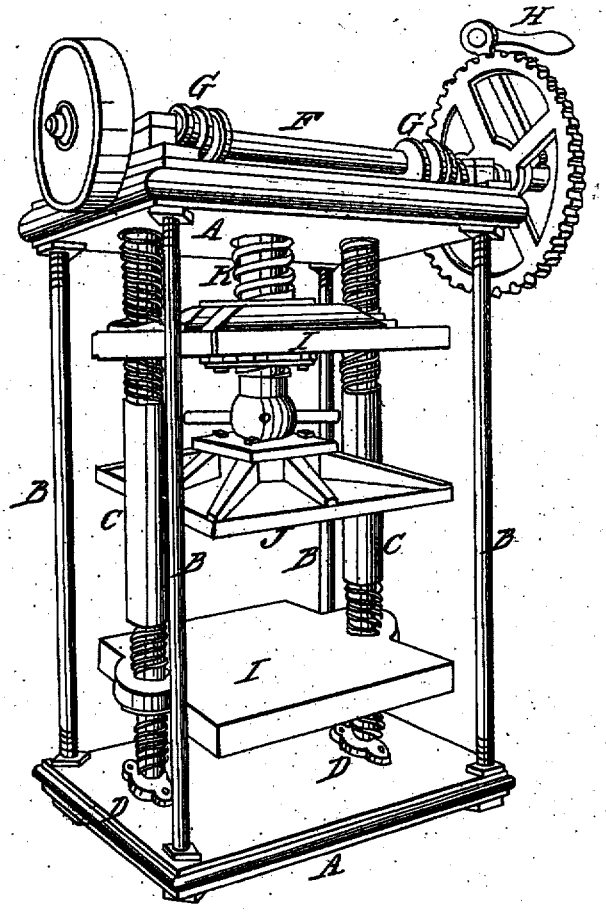

UNITED STATES PATENT OFFICE.

JOEL BARNS, OF PHILADELPHIA, PENNSYLVANIA.

STANDING PRESS.

Specification of Letters Patent No. 166, dated April 17, 1837.

*To all whom it may concern:*

Be it known that I, JOEL BARNS, of the city of Philadelphia, State of Pennsylvania, have invented a new and Improved Standing Press to be Used for the Pressing of Every Kind of Article to which such Presses are Adapted; and I do hereby declare that the following is a full and exact description thereof, reference being had to the drawings which accompany and make a part of this specification.

A, A′, are the bottom and top plank, or plates, of the press, forming a part of its frame.

B, B, are rods of iron passing through the top and bottom plates, and firmly secured to them by screw nuts, or otherwise.

C, C, are two screw shafts, each of them having a right handed screw at one end, and a left handed screw at the other, a blank space, not formed into a screw, being left between them. These screw shafts pass through the plate A′, and revolve within a suitable collar; they also revolve in steps D, D, at their lower ends. A toothed wheel, or pinion, not seen in the drawing, is firmly fixed on each of these shafts, just above the upper plate A′, and a horizontal shaft, F, carrying two endless screws G, G, which mesh into the wheels or pinions upon the screw shafts C, C, when turned by means of the winch H, or by a wheel and pinion, or any other suitable gearing, causes the screw shafts C, C, to revolve.

I, I′, are two platens, or followers, having nuts, or screw boxes, on, or within, them, adapted to the screws of the shafts; and it will be apparent that by the revolving of the shaft F, these platens, or followers, will be made to approach toward, or to recede from, each other, as may be desired. A third platen, or follower, J, has a screw, K, attached to, and swiveling on it, in the manner of the ordinary screw press, the female screw, or nut, within which it works, being fixed in the platen I; the upper end of this screw passes freely through a hole in the center of the upper plate A′. The use of this platen is to save time by the ease and rapidity with which it may be raised, or lowered, instead of raising, or lowering, the two platens first named. To effect this with the greatest facility, I usually make the thread of the screw, K, considerably coarser than that on the shafts C, C, the power of the press being dependent, in a great measure, upon the cutting the latter as fine as is compatible with the necessary strength.

It has not been thought necessary to give any particular dimensions, or the proportions of the respective parts to each other, as these will vary with the purpose to which the press is to be applied, and can be duly adjusted by any competent workman.

Having thus fully described the construction of my newly invented press, and the manner in which the same operates, I do hereby declare that I do not intend to claim the mere application of a shaft with a right and a left handed screw upon it, or either of the parts of the press described, taken individually and alone, as my invention, these being well known as elements of other machines; but

What I do claim, and wish to secure by Letters Patent, is—

The combination of these parts constituting a press with three platens, or followers, two of which are operated on by shafts having right and left handed screws, turned by a gearing constructed and arranged substantially in the manner herein described, while the third platen is raised, and lowered, by means of an independent screw, in the manner herein fully set forth.

JOEL BARNS.

Witnesses:
JOHN W. MURPHY,
CHAS. R. WATTSON.